(12) United States Patent
Worters et al.

(10) Patent No.: US 8,462,832 B1
(45) Date of Patent: Jun. 11, 2013

(54) METHODS AND APPARATUS FOR PROCESSING UPLINK SIGNALS

(75) Inventors: Peter Worters, Menlo Park, CA (US); Oliver Charlesworth, Cambridge (GB)

(73) Assignee: SpiderCloud Wireless Inc., Santa Clara, CA (US)

( * ) Notice: Subject to any disclaimer, the term of this patent is extended or adjusted under 35 U.S.C. 154(b) by 791 days.

(21) Appl. No.: 12/628,537

(22) Filed: Dec. 1, 2009

Related U.S. Application Data (60) Provisional application No. 61/119,353, filed on Dec. 2, 2008.

(51) Int. Cl.
*H04B 1/00* (2006.01)

(52) U.S. Cl.
USPC .......................................... 375/148; 375/130

(58) Field of Classification Search
USPC ................. 375/148, 130, 147, 260, 316, 340, 375/346, 347, 349; 370/232, 335, 465; 455/574
See application file for complete search history.

(56) References Cited

U.S. PATENT DOCUMENTS 6,778,499 B1 * 8/2004 Senarath et al. .............. 370/232

* cited by examiner

*Primary Examiner* — Khai Tran
(74) *Attorney, Agent, or Firm* — Straub & Pokotylo; Michael P. Straub; Steven T. Straub (57) ABSTRACT

Methods and apparatus for dynamically allocating processing resources between low rate, e.g., standard rate, and high rate data channel processing chains are described. This allows for different numbers of high data rate and standard data rate uplink users to be supported at different times using the same set of hardware.

18 Claims, 6 Drawing Sheets

METHODS AND APPARATUS FOR PROCESSING UPLINK SIGNALS

RELATED APPLICATION

This application claims the benefit of the filing date of U.S. Provisional Application No. 61/119,353, filed on Dec. 2, 2008, and entitled "METHODS AND APPARATUS FOR PROCESSING UPLINK SIGNALS," and which is hereby expressly incorporated by reference in its entirety.

FIELD

The present application is directed to communications methods and apparatus, and more particularly, to methods and apparatus which can be used to process uplink signals.

BACKGROUND

In some communications systems, e.g., some High Speed Packet Access (HSPA) systems, users may be assigned to use one or more data channels supporting different data rates for uplink communications, e.g., a standard or low rate data channel and, optionally, in addition to the standard data channel, a high speed data channel. In many communications systems, at a given time, a base station will service more users which are assigned the standard or low rate uplink data channel than users assigned both high speed and standard (or low rate) data channels at the same time. However, the number of users being provided high speed data channel service may vary from time to time depending on system loading and user needs.

While processing of standard and high speed data channel signals may involve similar steps such as buffering, filtering, descrambling and despreading, the actual operations may vary depending on whether the signal being processed corresponds to a high speed channel or a standard channel.

Figure 1:
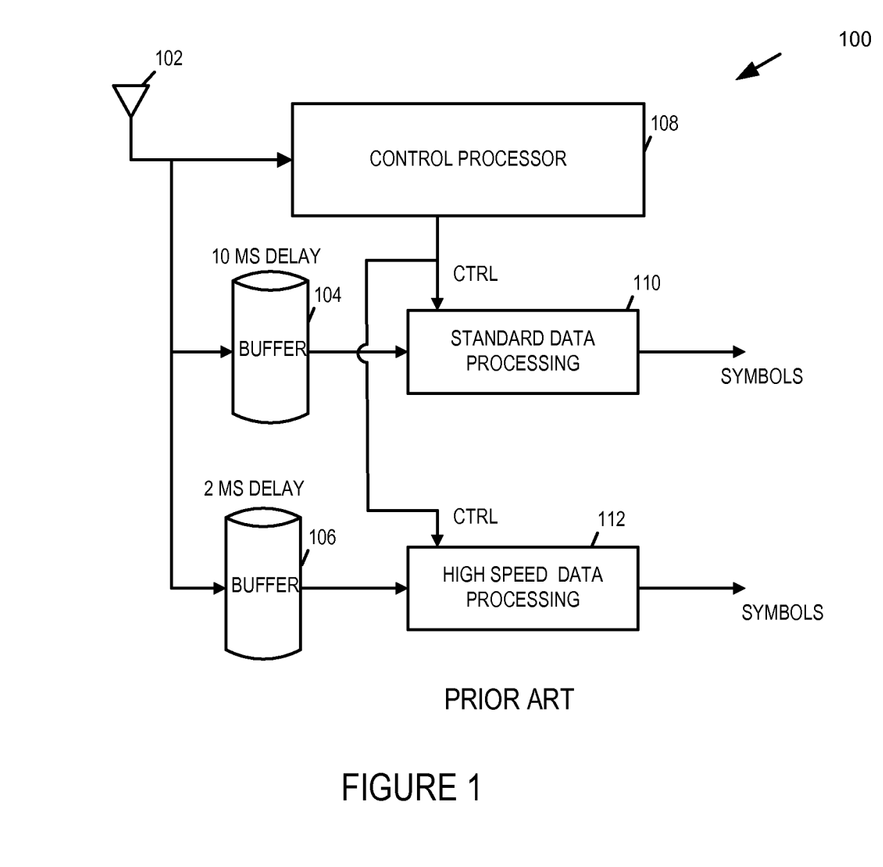
FIG. 1 illustrates a known base station receiver assembly.

FIG. 1 illustrates a known approach for supporting high speed data service. As illustrated in FIG. 1, in order to support high speed service, a standard data channel processing module 110 is provided in addition to a high speed data processing module 112. The standard data channel processing module 110 includes a first number of processing chains for processing standard rate data channels corresponding to different users. As shown in FIG. 1, the antenna 102 may receive uplink signals which are sampled and then processed by the standard data processing module 110 after the samples are buffered, e.g., for 10 ms, by buffer 104. The standard data processing module 110 produces symbols corresponding to one or more user data channels, e.g., for up to the first number of users. In order to support high speed data channels, the samples obtained by sampling the signals received by antenna 102 may also be buffered, e.g., for 2 ms, by buffer 106 and processed by the high speed data channel processing module 112. Note that the buffering for the high speed data channels is by a different amount than for the standard channels, e.g., in accordance with a predetermined standard. The high speed data processing module 112 includes a second number of processing chains, e.g., high speed processing chains, for supporting up to the second number of users as high speed users. The high speed data processing module 112 produces symbols corresponding to one or more high speed user data channels.

The control processor 108 detects control signals received via antenna 102 and controls the standard processing assembly 110 and high speed data processing assembly 112 to process signals corresponding to the users assigned to the high and standard data channels at a given time.

In order to support high data rates a user is normally assigned a high speed data channel in addition to a standard data channel, while when requiring lower data rate service the user is normally assigned the standard rate channel without the benefit of the high data rate channel.

The number of standard data rate channels which can be supported by assembly 110 is normally fixed and intentionally made larger than the number of channels that can be supported by the high speed data processing assembly 112 under the assumption that there will be considerably fewer high speed users than standard rate users at any given time.

The use of processing elements dedicated to standard or high speed data channels may be efficient when a device such as a base station supports a relatively large number of users and the numbers of standard to high data rate users can be expected to be reasonably constant. In small base stations, e.g., small access nodes such as femtocells, very few users may be supported at a given time. In such circumstances, the percentage of users seeking standard data rate service vs high speed service may change dramatically given that there are very few users, e.g., less than 10 users in some cases, being supported at a given time.

In the case of small base stations such as femtocells, implementation cost is often an issue. Accordingly, it is desirable in many cases to minimize the amount of processing circuitry or elements used to implement a small base station such as a femtocell.

In view of the above discussion, it should be appreciated that it would be desirable in at least some base station implementations, if processing resources were not dedicated in a fixed manner to standard or high speed uplink channels but were rather allocatable as needed to either high speed or standard data channel processing. Accordingly, it should be appreciated that there is a need for dynamically allocating processing resources between high speed and standard speed users so that the number of high speed and standard speed users which can be supported can be varied depending on user demands at a given time, e.g., with a larger number of total users and more standard uplink channels being supported at one time and with fewer standard rate uplink users being supported at a second time but with a higher number of high speed users being supported at the second time than the first time.

SUMMARY

Methods and apparatus for dynamically allocating processing resources between low rate, e.g., standard rate, and high rate data channel processing chains are described. This allows for different numbers of high data rate and standard data rate uplink users to be supported at different times using the same set of hardware.

While various embodiments have been discussed in the summary above, it should be appreciated that it is not necessary for all embodiments to include the same features and some of the features described above are not necessary but can be desirable in some embodiments. Numerous additional features, embodiments and benefits of various embodiments are discussed in the detailed description which follows.

DETAILED DESCRIPTION

Figure 2:
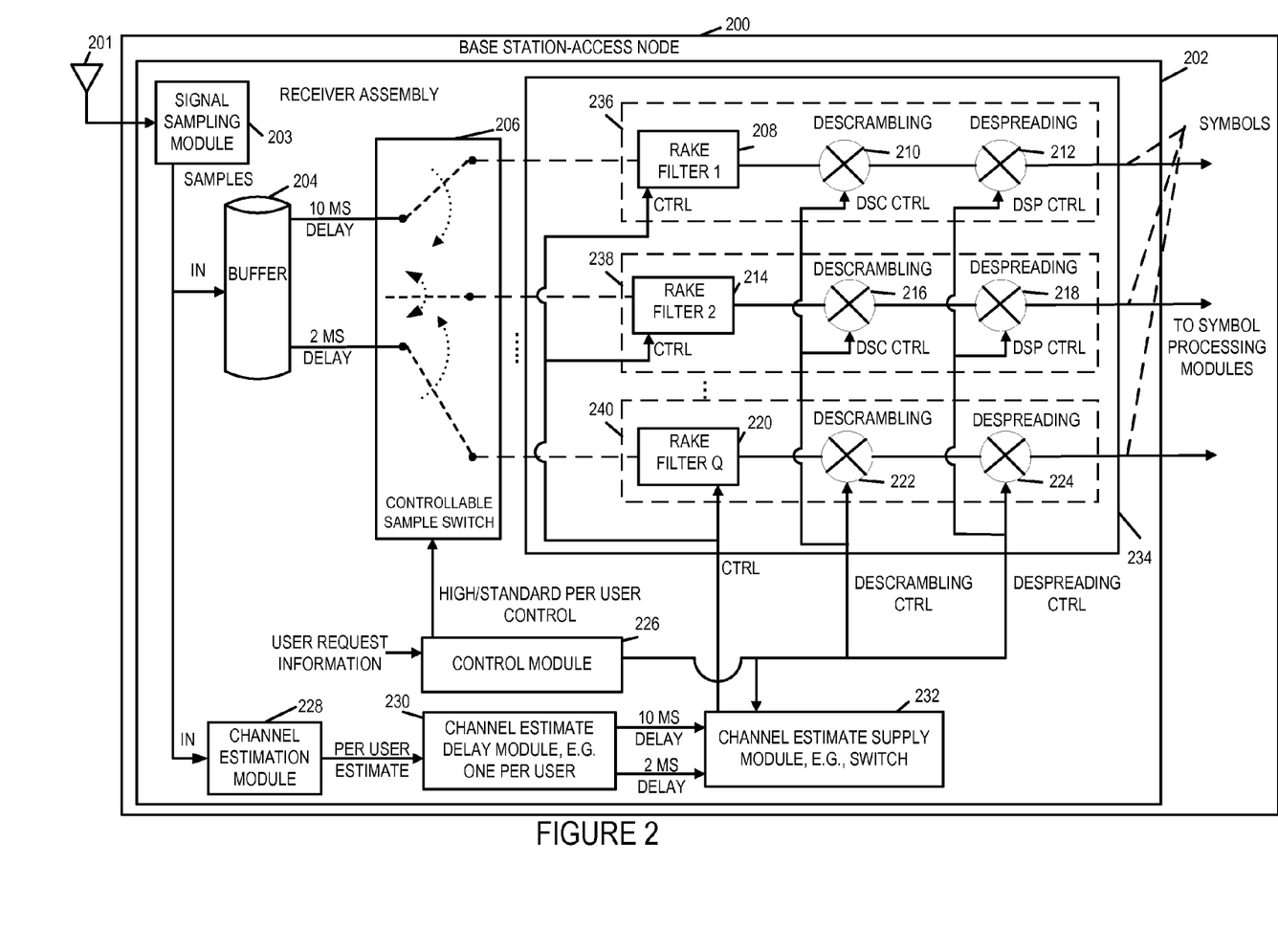
FIG. 2 illustrates an exemplary base station, e.g., access node such as a femtocell, implemented in accordance with one aspect of the invention.

FIG. 2 illustrates an exemplary base station, e.g., access node, 200 implemented in accordance with the invention. In the illustrated system signals, e.g., CDMA signals, are received via antenna 201, sampled by signal sampling module 203, and the samples are stored in buffer 204 in addition to being supplied channel estimation module 228. A control module 226 receives user request information, e.g., recovered from a control channel, which indicates a user data rate request indicating a desire to be assigned a high data rate channel in addition to a standard data rate channel or simply requests use of a standard data rate channel. The control module 226 determines which users are assigned to be high data rate users and which users are to be low (standard) data rate users. The high rate users are assigned a high data rate channel in addition to a standard data rate channel. Lower data rate users are assigned simply to a lower, e.g., standard, data rate channel and are not provided an additional high data rate channel. The buffering of high data rate samples to be used for high speed processing chains is controlled to be different from that used for the standard rate channels. Thus samples are buffered in one embodiment for 2 ms prior to processing by processing chains configured to operate as high speed processing chains while the same set of samples is output after 10 ms for processing by processing chains configured to operate as standard data rate processing chains. Thus, the buffer 204 includes both high and low data channel outputs with the corresponding delays. Controllable sample switch 206, under control of control module 226 controls which of the receiver processing chains 236, 238, . . . , 240 will receive the delayed samples corresponding to the high or low data channel sample delay. Thus when a processing chain is controlled to operate as a high speed or standard data rate processing chain by control module 226, it will be supplied with samples having the appropriate delay. While the full set of receiver processing chains 236, 238, . . . 240 may and often are used at the same time, less than the full set of receiver processing chains may be used in cases of light loading, e.g, when a single user is being supported by the base station.

In order to allow processing chains 236, 238, 240 to be assigned to different user and to operate as a high or standard data channel processing chain, the control module 226 controls the supply of data and control signals to the individual processing chains so that the elements included therein operate in the appropriate manner and receive information or signals corresponding to the appropriate delay, e.g, 10 ms or 2 ms, which is appropriate depending on whether the processing chain is operating in a standard speed or high speed data channel processing chain, respectively.

Input samples are processed and a channel estimation operation is performed on a per user basis by channel estimation module 228. Accordingly, if N users are supported at a given time, the channel estimation module 228 will generate N channel estimates, e.g., one per user. The per user channel estimates are stored in channel estimate delay module 230 and output on a per user basis. For each high speed user, 2 ms and 10 ms delayed channel estimates will be output so they can be supplied by the channel estimate supply module 232 to the processing chains assigned to provide high speed and standard speed uplink data stream processing to the individual user. The channel estimates are used to control the rake filter in the individual processing chain so that signals corresponding to different delays within the rake filter module are combined to provide good signal recovery results. If a user is assigned a standard rate uplink channel and not a high speed channel, the 2 ms delayed channel estimate corresponding to the individual user will go unused since high speed data channel processing need not be supported.

Each processing chain 236, 238, 240 which may be assigned to service a user includes a rake filter 208, 214 or 220, a descrambling module 210, 216 or 222 and a despreading module 212, 218 or 224 which are controlled on a per user basis and on the basis of whether the processing chain is operating as a high speed or standard speed processing chain.

Thus, under control of the control module 226, the individual processing chains 236, 238 and 240 can be dynamically allocated to individual users and to perform either high speed channel symbol recovery or standard (low) rate channel symbol recovery.

The ability to switch processing chains 236, 238, 240 between high and low rate data channel processing allows for greater flexibility and hardware reuse as compared to less flexible systems where the number of standard and high speed data channel processing chains is fixed.

Figure 3:
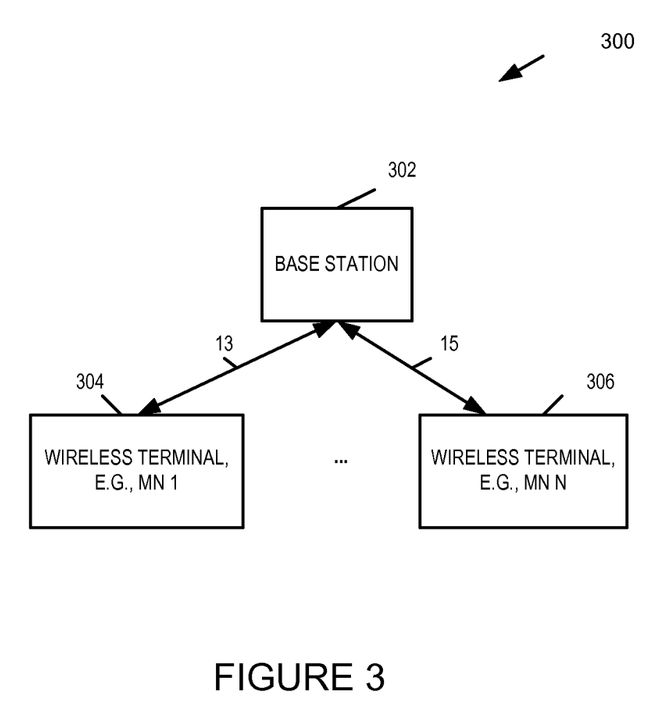
FIG. 3 illustrates an exemplary communication system implemented in accordance with one embodiment of the invention.

FIG. 3 illustrates a communications system 300 implemented in accordance with one exemplary embodiment of the invention. In the system 300, multiple wireless terminals, e.g., mobile nodes MN 1 (304) through MN N (306) communicate with a base station 302, e.g., a femtocell, through the use of communication signals 13, 15. While shown as exemplary mobile nodes, the wireless terminal may also include stationary devices. Each mobile terminal may correspond to a different mobile user and are therefore sometimes referred to as user terminals. The signals 13, 15 may be, e.g., CDMA or OFDM signals. The base station 302 performs uplink signal processing in accordance with the invention. Thus, signals 13, 15 include uplink signals.

Figure 4:
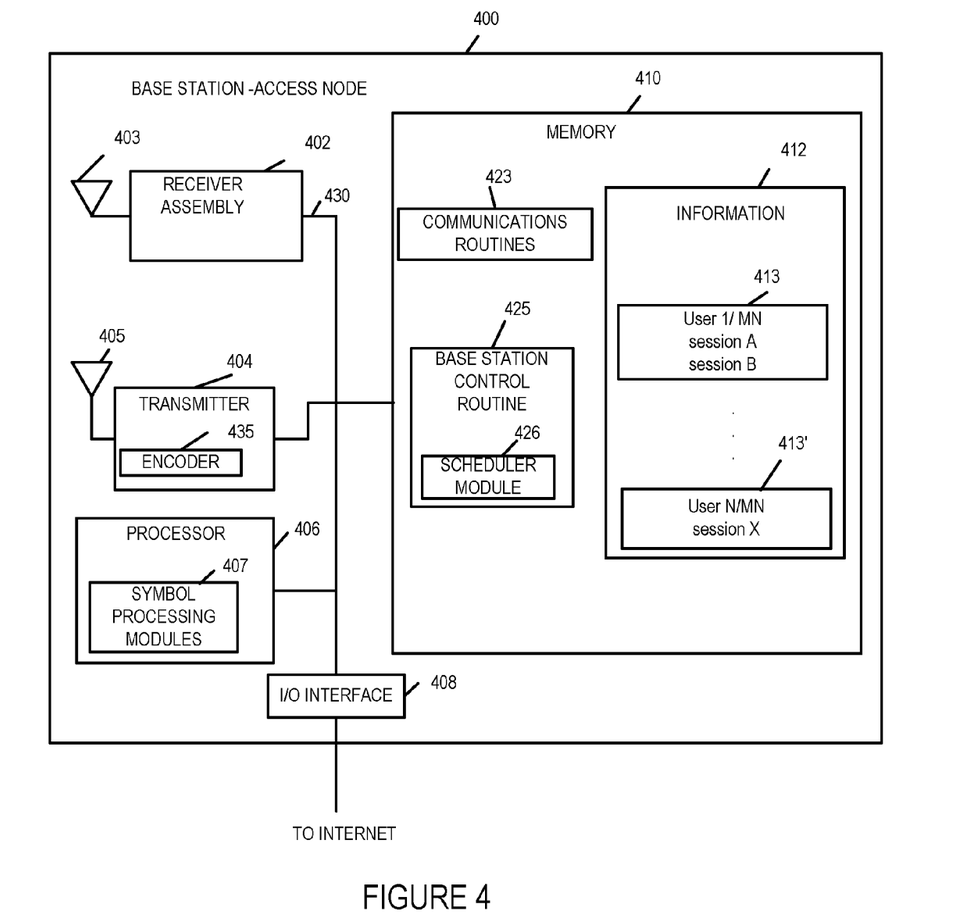
FIG. 4 illustrates another exemplary base station, e.g., access point, implemented in accordance with the invention.

FIG. 4 illustrates an exemplary base station 400 which may be e.g., an access router, implemented in accordance with the invention. In some embodiments the base station 400 can be used as, e.g., femtocell 302 of system 300. The base station 400 includes antennas 403, 405 and receiver transmitter circuitry 402, 404. The transmitter circuitry 404 includes an encoder 435. The receiver assembly 402 may be, and in some embodiments is, implemented as the exemplary receiver assembly 202 shown in FIG. 2. The receiver and transmitter circuitry 402, 404 is coupled by a bus 430 to an I/O interface 408, processor (e.g., CPU) 406 and memory 410. The I/O interface 408 couples the base station 400 to the internet and/or an IP network. The memory 410 includes routines, which when executed by the processor 406, causes the base station 400 to operate in accordance with the invention. In some embodiments, the processor 406 includes symbol processing modules 407 which are configured to perform additional processing on recovered symbols output by one or more despreading modules, e.g., despreading modules 212, 218 and 224. Memory 410 includes communications routines 423 used for controlling the base station 400 to perform various communications operations and implement various communications protocols. The memory 410 also includes a base station, e.g, femtocell, control routine 425 used to control the base station 400 to implement the steps of the method of the present invention. The base station control routine 425 includes a scheduling module 426 used to control transmission scheduling and/or communication resource allocation. Thus, module 426 may serve as a scheduler. Memory 410 also includes information 412 used by communications routines 423 and control routine 425. The information 412 includes an entry for each active mobile station user 413, 413' which lists the active sessions being conducted by the user and includes information identifying the mobile station (MN) being used by a user to conduct the sessions.

Figure 5A:
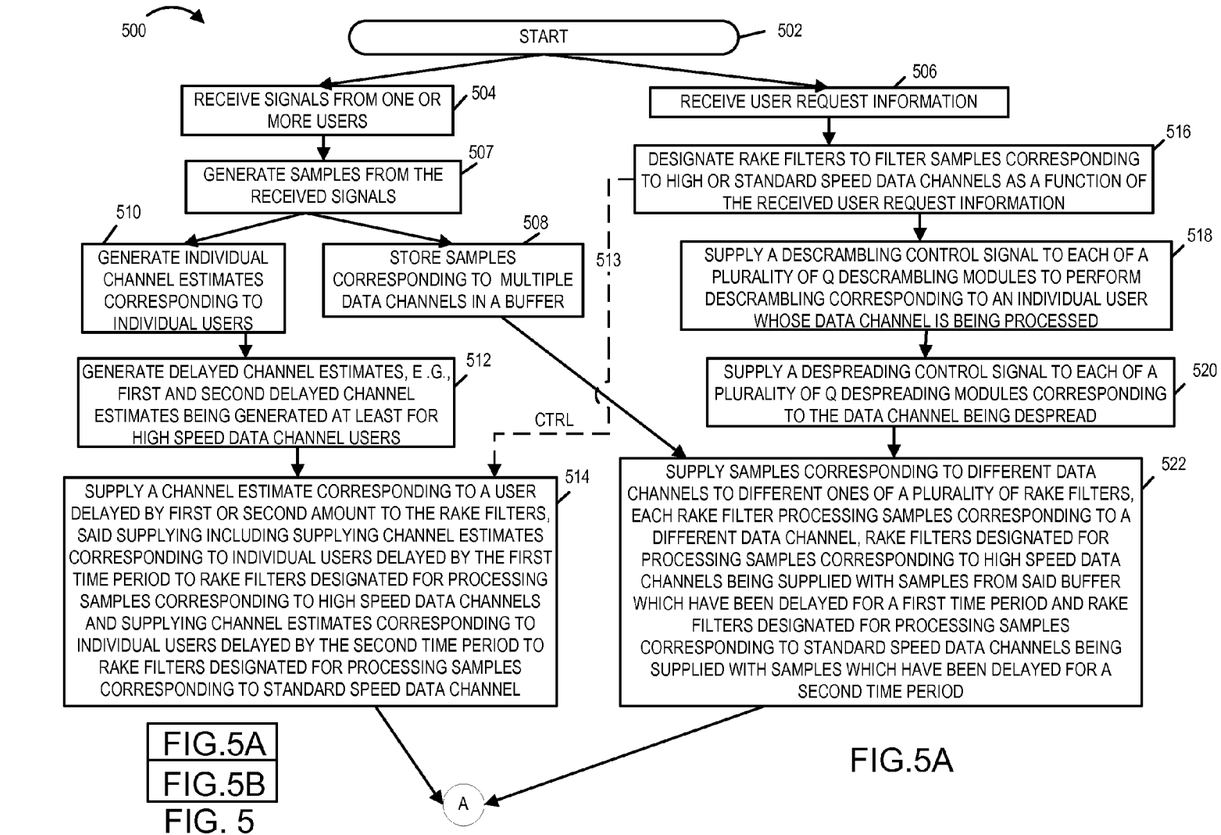
FIG. 5, comprising the combination of FIG. 5A and FIG. 5B, is a flowchart illustrating an exemplary method of processing samples corresponding to multiple data channels in accordance with one exemplary embodiment.
Figure 5B:
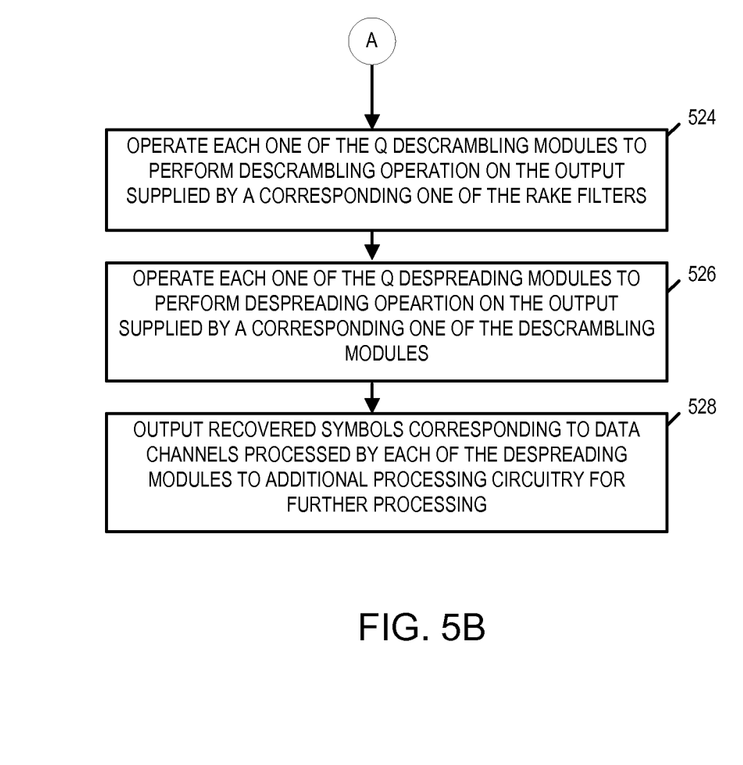

FIG. 5, comprising the combination of FIG. 5A and FIG. 5B, is a flowchart 500 illustrating the steps of an exemplary method of processing samples corresponding to multiple data channels in accordance with one exemplary embodiment. The exemplary method of flowchart 500 may, and in some embodiments is, implemented by the exemplary receiver assembly 202 of base station 200 shown in FIG. 2.

Operation starts in step 502 where the receiver assembly 202 is powered on and initialized. Operation proceeds from the start step 502 to steps 504 and 506 which may occur asynchronously. In step 504 the antenna of the receiver assembly 202 receives signals from one or more users, e.g., wireless terminals communicating with the base station 200. Operation proceeds from step 504 to step 507. In step 507 the signals are sampled to generate samples corresponding to the received signals. The sampling of the received signals can be done using known techniques.

Operation proceeds from step 507 to steps 508 and 510 which can be performed in parallel. In step 508 the samples corresponding to multiple data channels are stored in the buffer 204. Operation proceeds from step 508 to step 522. As discussed in FIG. 2 example, in addition to being stored in the buffer 204, the samples are supplied to the channel estimation module 228. In step 510 individual channel estimates corresponding to individual users are generated using the received samples. Thus if N users are supported at a given time, the channel estimation module 226 generates N channel estimates, e.g. one per user. In some embodiments the per user channel estimates are then supplied to the channel estimate delay module 230 and are stored in the channel estimate delay module 230.

The operation proceeds from step 510 to step 512 wherein the channel estimate delay module generates delayed channel estimates, e.g., first and second channel estimates being generated at least for high speed data channel users. Thus in some embodiments the channel estimate delay module 230 generates a plurality of delayed versions of the channel estimates. In accordance with one aspect of the invention, the channel estimates delay module 230 generates at least two delayed channel estimate corresponding to high data rate channel users, e.g., one delayed by 2 milli seconds (ms) and the other delayed by 10 milli seconds (ms). In some embodiments a single delayed channel estimate is generated corresponding to a low data rate channel user. The delayed versions of the channel estimates are then supplied to the channel estimate supply module 232 as discussed in FIG. 2. Operation proceeds from step 512 to step 514.

Now returning to step 506, in step 506, the control module 226 receives user request information, e.g., recovered from a control channel which indicates a user data rate request, e.g., whether a user indicated a desire to be assigned a high data rate channel for communicating in addition to being assigned a standard rate channel, or if a user indicated a desire to be simply assigned a standard rate data channel. Sometimes the users requesting high data rate channels are also referred to as high data rate users, while the users requesting low/standard data rate channels are referred to as low data rate users. In accordance with one aspect, high data rate users are assigned a high data rate channel in addition to a standard data rate channel. Operation proceeds from step 506 to step 516. In step 516 the control module 226 designates rake filters to filter samples corresponding to high or standard speed data channels as a function of the received user request information. Thus based on the user request information, the control module 226 determines which users are to be assigned high data rate channels and which users are to be assigned standard/low data rate channels and designates the rake filters for processing samples corresponding to these individual users accordingly.

Operation proceeds from step 516 to 518. In step 518 the control module 226 supplies descrambling a control signal to each of a plurality of Q descrambling modules to perform descrambling corresponding to each individual user whose data is being processed. The descrambling control signals provided to each individual descrambling module control the individual descrambling module to perform descrambling on the data being output from the corresponding rake filter to which the descrambling module is coupled to. For example, descrambling module 210 under the directions of a control signal from the control module 226 will descramble data output from rake filter 1 208. The descrambled data from each descrambling module is then passed on to the corresponding despreading modules in the processing chain. Operation proceeds from step 518 to step 520 wherein the control module 226 supplies despreading a control signal to each of a plurality of Q despreading modules corresponding to the data channel being despread by each individual despreading module, each despreading module outputting recovered symbols corresponding to the data channel processed by the despreading module. Operation proceeds from step 520 to step 522

Now returning to step 522, in step 522, following the storing of samples in the buffer 204 and designation of rake filters for processing samples corresponding to high or standard rate users by the control module, samples corresponding to different data channels are supplied to different ones of a plurality of Q rake filters, each rake filter processing samples corresponding to a different data channel, rake filters designated for processing samples corresponding to high speed data channels being supplied with samples from said buffer which have been delayed for a first time period and rake filters designated for processing samples corresponding to standard speed data channels being supplied with samples which have been delayed for a second time period. Thus the control module 226 controls the supply of samples to the rake filters in each of the processing chains, such that the rake filters designated for processing samples corresponding to high speed data channel are being supplied with samples from buffer 204 which have been delayed for the first time period, e.g., 2 ms and rake filters designated for processing samples corresponding to standard speed data channels are being supplied with samples which have been delayed for a second time period, e.g., 10 ms. In some embodiments the second time period is longer than the first time period. Thus in accordance with one feature, the samples corresponding to users which have been assigned high data rate channel will be supplied to processing chains designated for high speed uplink data stream processing from high data speed users, while samples corresponding to low/standard data rate channel users will be supplied to processing chains designated for standard speed uplink data stream processing. The operation proceeds from step 522 to step 524 via connecting node A.

Returning now to step 514, in step 514, following the designation of rake filters for processing samples corresponding to high or standard rate users, the channel estimate supply module 232 supplies a channel estimate corresponding to a user delayed by first or second amounts to the rake filters which are part of the processing chains, e.g., 236, 238, . . . , 240. Arrow 513 indicates that information regarding the designation of rake filters is available to the channel estimate supply module 232. It should be appreciated that the controllable switch 206, that supplies samples corresponding to different users to the designated rake filters, and the channel estimate supply module 232 both operate under the direction of control module 226. Therefore channel estimate supply module 232 under the direction of control module 226 is able to supply a correctly delayed channel estimate to the corresponding processing chain which is designated for processing samples corresponding to the user for whom the channel estimate was generated. Step 514 of supplying includes supplying the channel estimates corresponding to individual users delayed by a first time period, e.g., 2 ms, to the rake filters designated for processing samples corresponding to high speed data channels, and supplying channel estimates corresponding to individual users delayed by a second time period, e.g., 10 ms, to the rake filters designated for processing samples corresponding to the standard speed data channels. This is done so that appropriately delayed versions of channel estimates can be applied to the corresponding signals for better signal recovery. Thus if a user is assigned a standard rate uplink channel for processing uplink signal from the user, the 10 ms delayed channel estimate corresponding to the user channel is supplied to the rake filter while the 2 ms delayed channel estimate corresponding to the individual user will go unused. Operation proceeds from step 514 to step 524 via connecting node A.

In step 524, each one of the Q descrambling modules 210, 216, 222 in the processing chains is operated to perform descrambling operation on the output supplied by the corresponding one of the rake filters. Thus each descrambling module coupled to a corresponding rake filter performs descrambling on the data output produced by the corresponding rake filter. Each of the descrambling modules performs descrambling corresponding to the individual user whose data is being processed. The processed output, i.e., descrambled output, from each of the descrambling modules is then supplied to a corresponding one of the despreading modules in the respective processing chains.

Operation proceeds from step 524 to step 526. In step 526 each one of the Q despreading modules 212, 218, 224 in the processing chains is operated to perform despreading operation on the output supplied by the corresponding one of the descrambling modules. Thus each despreading module coupled to a corresponding descrambling module despread the descrambled output produced by the corresponding descrambling module in the processing chain. Each despreading module outputs recovered symbols corresponding to the data channel processed by the despreading module. The operation proceeds from step 526 to step 528 wherein recovered symbols corresponding to data channels processed by each of the despreading modules are supplied to additional processing circuitry, e.g., symbol processing modules, for further processing.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating an apparatus, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In some embodiments various features are implemented using modules. Such modules may be implemented using software, hardware or a combination of software and hardware. Many of the above described methods or method steps can be implemented using computer executable instructions, such as software, included in a computer readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a computer readable medium including computer executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling an apparatus and/or a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other devices described in the present application.

In some embodiments, the processor or processors, e.g., CPUs, of one or more devices, e.g., communications devices such as base station or wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. The modules may be implemented using software and/or hardware.

At least some of the methods and apparatus of various embodiments are applicable to a wide range of communications systems including many CDMA as well as non-CDMA, and/or non-cellular systems including some OFDM systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. An apparatus for processing samples corresponding to multiple data channels, comprising:
    a buffer for storing samples corresponding to said multiple data channels;
    a plurality of Q rake filters, each rake filter for processing samples corresponding to a different data channel, Q being greater than 1; and
    a control module configured to designate a first set of rake filters in said plurality of Q rake filters for processing samples corresponding to high speed data channels which have been delayed by said buffer for a first time period and configured to designate a second set of rake filters in said plurality of Q rake filters for processing samples corresponding to standard speed data channels which have been delayed for a second time period, said control module being further configured to control supply of samples from said buffer to rake filters in said first and second sets of rake filters.

2. The apparatus of claim 1, wherein said second time period is longer than said first time period.

3. The apparatus of claim 1, further comprising:
    a controllable sample switch coupled to said buffer and to said control module, the controllable sample switch supplying samples under the control of said control module to said first and second sets of rake filters.

4. The apparatus of claim 3, wherein said control module receives user request information and designates at least one of said Q rake filters to filter samples corresponding to high or standard speed data channels as a function of the received user request information.

5. The apparatus of claim 4, further comprising:
    a channel estimator for generating individual channel estimates corresponding to individual users; and
    a channel estimate delay module for generating delayed versions of said channel estimate, first and second delayed estimates being generated at least for high speed data channel users; and
    a channel estimate supply module for supplying a channel estimate, corresponding to a user, delayed by the first time period, to a rake filter assigned to said user for processing samples of a high speed data channel.

6. The apparatus of claim 5, further comprising:
    a plurality of Q descrambling modules, each one of said Q descrambling modules being coupled to an output of a corresponding one of said rake filters, said control module supplying descrambling control signals to each of the descrambling modules to control the descrambling module to perform descrambling corresponding to an individual user whose data channel is being processed.

7. The apparatus of claim 6, further comprising:
    a plurality of Q despreading modules, each one of said Q despreading modules being coupled to an output of a corresponding one of said Q descrambling modules, said control module supplying despreading control signal corresponding to the data channel being despread, each despreading module outputting recovered symbols corresponding to the data channel processed by the despreading module.

8. An apparatus for processing samples corresponding to multiple data channels, comprising:
    buffer means for storing samples corresponding to said multiple data channels;
    a plurality of Q rake filter means, each rake filter means for processing samples corresponding to a different data channel, Q being greater than 1; and
    control means for designating a first set of rake filters in said plurality of rake Q filters to process samples corresponding to high speed data channels which have been delayed by said buffer means for a first time period, for designating a second set of rake filters in said plurality of rake Q filters to process samples corresponding to standard speed data channels which have been delayed by said buffer means for a second time period, and for controlling supply of samples stored in said buffer to rake filters in said first and second sets of rake filters.

9. The apparatus of claim 8, wherein said second time period is longer than said first time period.

10. The apparatus of claim 8, further comprising:
    controllable sample switching means for supplying samples to different ones of said rake filter means, said controllable sample switching means being coupled to said buffer means and to said control means.

11. The apparatus of claim 10, wherein said control means receives user request information and designates at least one of said rake filter means to filter samples corresponding to high or standard speed data channels as a function of the received user request information.

12. The apparatus of claim 11, further comprising:
    channel estimation means for generating individual channel estimates corresponding to individual users; and
    channel estimate delay means for generating delayed versions of said channel estimate, first and second delayed estimates being generated at least for high speed data channel users; and
    channel estimate supply means for supplying a channel estimate, corresponding to a user and delayed by the first time period, to a rake filter means assigned to said user for processing samples of a high speed data channel.

13. The apparatus of claim 12, further comprising:
    a plurality of Q descrambling means for performing descrambling, each one of said Q descrambling means being coupled to an output of a corresponding one of said rake filter means, said control means supplying descrambling control signals to each of the descrambling means that control the descrambling means to perform descrambling corresponding to an individual user whose data channel is being processed.

14. A method of processing samples corresponding to multiple data channels, comprising:
    storing samples corresponding to said multiple data channels in a buffer; and
    supplying samples corresponding to different data channels to different ones of a plurality of rake filters, said plurality of rake filters including a first set of rake filters for processing samples corresponding to high speed data channels which have been delayed for a first time period and a second set of rake filters for processing samples corresponding to standard speed data channels which have been delayed for a second time period, said second time period being longer than said first time period.

15. The method of claim 14, further comprising:
receiving user request information; and
designating at least one rake filter in said plurality of rake filters to filter samples corresponding to high or standard speed data channels as a function of the received user request information.

16. The method of claim 15, further comprising:
generating individual channel estimates corresponding to individual users;
generating delayed channel estimates, first and second delayed channel estimates being generated at least for high speed data channel users; and
supplying a channel estimate corresponding to a user delayed by the first time period to a rake filter assigned to said user for processing samples of a high speed data channel.

17. The method of claim 16, wherein said plurality of rake filters include Q rake filters, each one of Q descrambling modules being coupled to a corresponding one of the Q rake filters, the method further comprising:

supplying descrambling control signals to each of a plurality of Q descrambling modules to control each of the descrambling modules to perform descrambling corresponding to an individual user whose data channel is being processed.

18. The method of claim 17, wherein each of the descrambling modules is coupled to a corresponding one of Q despreading modules, the method further comprising:

supplying a despreading control signal to each of the Q despreading modules, corresponding to the data channel being despread, each despreading module outputting recovered symbols corresponding to the data channel processed by the despreading module.

* * * * *